(Model.)
J. H. LUX.
Horse Hay Fork.
No. 243,382.   Patented June 28, 1881.
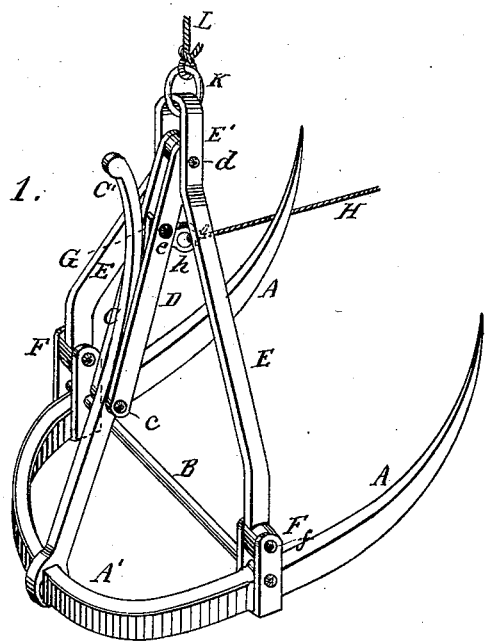
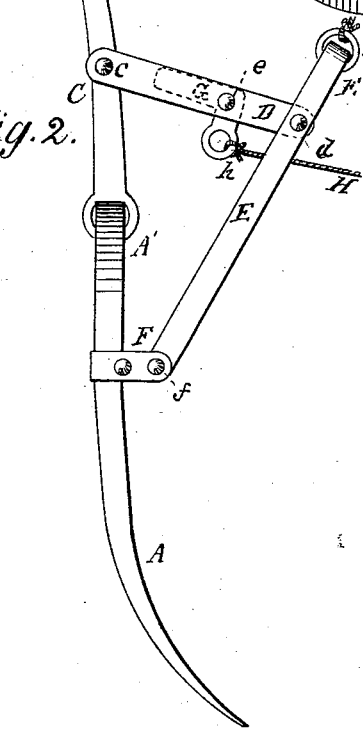
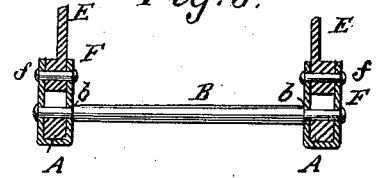
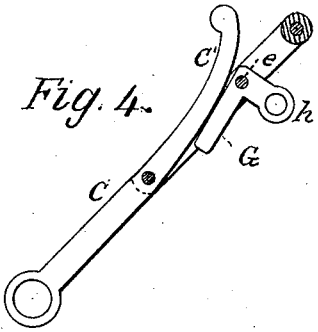
WITNESSES
Fred. G. Dieterich
John A. Tauberschmidt
John H. Lux
INVENTOR,
By his Attorneys,
Louis Bagger & Co.
N. PETERS, Photo-Lithographer, Washington, D. C.

UNITED STATES PATENT OFFICE.

JOHN H. LUX, OF EARLVILLE, IOWA.

HORSE HAY-FORK.

SPECIFICATION forming part of Letters Patent No. 243,382, dated June 28, 1881.

Application filed April 8, 1881. (Model.)

*To all whom it may concern:*

Be it known that I, JOHN H. LUX, of Earlville, in the county of Delaware and State of Iowa, have invented certain new and useful Improvements in Hay-Forks; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved horse hay-fork. Fig. 2 is a side view of the same, showing it in its "tripped" position, ready for insertion into or withdrawal from a load of hay. Fig. 3 is a cross-section laid through the cross-bar B which connects the tines, and Fig. 4 is a detail view of the dog or device for tripping the fork.

Similar letters of reference indicate corresponding parts in all the figures.

My invention has relation to horse hay-forks; and it consists in certain improvements in the fork for which Letters Patent of the United States No. 193,977 were granted to me on the 7th day of August, 1877, which said improvements are hereinafter more fully described, and particularly pointed out in the claim.

In the annexed drawings, A A are the prongs or tines, made of steel, preferably with sharp curved points, and having a rounded back, A', of the same material. At the point on each side where the tine projects forward from its curved back piece I place a clip, F, in the upper part of which is hinged upon a bolt, *f*, one of the diverging arms of the bail E, the top of which is contracted to form a loop or eye, E', into which a ring or link, K, is inserted, to which the hoisting-rope L is attached.

B is a cross-bar, which is tenoned at opposite ends (see Fig. 3) to form shoulders *b b*, which bear against the inner side of the bail-clips F F. The tines A A are recessed or notched transversely in a line with the cross-bar B, the tenoned or reduced ends of which are inserted through the clips and partially embedded in the notched tines. This construction and combination of the tines, clips, bail, and cross-bar greatly strengthen the said parts, besides giving free play to the motion of the bail and tines in loading or unloading the fork.

C is a lever-arm, the lower end of which is hinged upon the middle of the bent fork-back A', while its upper end is curved outwardly, as shown at C'.

D is an arm, made in two parallel pieces, which is pivoted to the hinged lever C at *c*, and connects it with the loop E' of bail E, in which said arm D is pivoted upon a bolt, *d*. Between the two pieces which constitute the arm D is pivoted, upon a bolt, *e*, an elbow lever or dog, G, the inner end of which has an eye, *h*, for the attachment of the trip-rope H.

From the foregoing description, taken in connection with the drawings, the operation of my improved horse hay-fork will be readily understood.

To insert the fork into the hay the operator catches the bent lever C C' with one hand and the bail-loop E' with the other hand, pulling them apart, which throws the tines down into the position shown in Fig. 2, when they are easily forced into the hay by pressing with the foot upon cross-bar B. When the load is well on the fork, lever C C' is again raised into its former position, (shown in Fig. 1,) and the fork is hoisted up by the rope or chain L, carrying its load of hay. To unload it a sharp pull upon the trip-line H tilts the elbow G so as to cause its long arm to strike against the upper curved part C' of lever C, throwing it out from the bail, when the weight of the load on the tines will turn these in a downward direction, when they may readily be withdrawn from the load.

Having thus described my invention, I claim and desire to secure by Letters Patent of the United States—

In a horse hay-fork, the combination of the transversely notched or recessed fork A A' A, side clips, F F, shouldered cross-bar B, and hinged bail E' E, substantially as set forth.

In testimony that I claim the foregoing as my own I have hereunto affixed my signature in presence of two witnesses.

JOHN H. LUX.

Witnesses:
PHILIP LUX,
JOHN YOUNG.